United States Patent [19]

Loos et al.

[11] Patent Number: 4,779,639
[45] Date of Patent: Oct. 25, 1988

[54] AUTOMATIC RECIRCULATION VALVE

[75] Inventors: George J. Loos, North Wales; Ervin Skovgaard, Warrington, both of Pa.

[73] Assignee: Keystone International Holdings Corp., Wilmington, Del.

[21] Appl. No.: 66,623

[22] Filed: Jun. 26, 1987

Related U.S. Application Data

[62] Division of Ser. No. 926,437, Nov. 3, 1986.

[51] Int. Cl.⁴ ............................................. F16K 11/10
[52] U.S. Cl. ................................... 137/117; 137/504; 137/508
[58] Field of Search ............... 137/116, 117, 508, 503, 137/504, 497, 484.2

[56] References Cited

U.S. PATENT DOCUMENTS

| | | | |
|---|---|---|---|
| 1,215,071 | 2/1917 | Steedman | 137/116 X |
| 1,771,413 | 7/1930 | McCune | 137/116 |
| 2,886,058 | 5/1959 | Horton | 137/484.2 |
| 4,116,212 | 9/1978 | Cooper | 137/508 X |
| 4,243,064 | 1/1981 | Nolte | 137/117 |
| 4,244,388 | 1/1981 | Feiss | 137/116 |
| 4,638,831 | 1/1987 | Lindgren | 137/117 |

Primary Examiner—Martin P. Schwadron
Assistant Examiner—Stephen M. Hepperle
Attorney, Agent, or Firm—John W. Logan, Jr.

[57] ABSTRACT

An automatic recirculation valve is disclosed which utilizes three valve elements to accomplish particularly smooth and nondisruptive switching of fluid flow between main fluid flow and recirculation fluid flow. A unique back pressure control valve provides close control over changes in fluid pressure relative to fluid flow rate and functions to suppress erosion and cavitation of the bypass valve.

5 Claims, 2 Drawing Sheets

4,779,639

AUTOMATIC RECIRCULATION VALVE

BACKGROUND OF THE INVENTION

This application is a division of our copending application Ser. No. 926,437, filed Nov. 3, 1986.

This invention relates to automatic recirculation valves. Particularly, the present invention is directed to valves for bypass recirculation control in centrifugal pumping systems.

Bypass valves presently employed in recirculation control of pumping systems take primarily one of two forms. Conventional systems employ component valves within each line of the fluid system to control main flow, flow sensing, back pressure flow, and cascade flow to reduce high pressure energy. A more recent development has provided single flow control regulators which combine all these functions. Such a device is disclosed in U.S. Pat. No. 4,095,611 issued to Hetz on June 20, 1978. The single flow control regulators greatly simplify the process of recirculation of fluid through continuously operating pumps and effectively avoid serious complications such as "water hammer."

A critical element in valves of this type is the bypass valve which controls the flow of high velocity fluid from the high pressure side of the pump to the low pressure return vessel. High velocity flow through the bypass valve combined with a large pressure drop across the bypass valve may cause severe cavitation and erosion of the bypass valve. It has been known to provide a restricted orifice in the return line from the bypass valve to the return vessel to limit the pressure drops across the bypass valve. This, however, only limits the cavitation and erosion problems at high rates of flow since the pressure drop across an orifice varies directly with the rate of flow and thus at low rates of flow the principal pressure drop is within the bypass valve.

It is therefore an object of the present invention to provide and back pressure control valve in which the pressure drop from the supply line to the low pressure return vessel is divided between the bypass valve and the back pressure control valve, with the pressure drop across the back pressure control valve remaining relatively constant or increasing only slightly with an increase in flow rate.

Another object of the present invention is to provide a novel back pressure control valve in which the pressure drop across the valve may remain relatively constant regardless of the rate of flow of fluid through the valve.

It is a further object of the present invention to provide a flow control regulator which controls main flow and bypass flow in a single unit of relatively simply construction and operation.

SUMMARY OF THE INVENTION

The present invention provides an automatic recirculation valve which has the unique ability to very smoothly switch between main flow and recirculation flow. This minimizes fluid surge and greatly decreases wear and maintenance within the regulator and throughout the fluid system. In addition, the present invention includes a novel back pressure control valve which maintains a relatively uniform back pressure on the bypass valve regardless of the rate of fluid flow, thereby minimizing cavitation and erosion within the bypass valve.

The present invention operates through the cooperation of a main valve element, a bypass valve element, and a back pressure control valve all housed within a casing having an inlet, a main outlet, and a bypass outlet. When fluid flow between the inlet and the main outlet through the main valve element decreases, the main valve element approaches its closed position and simultaneously opens the bypass valve element providing fluid flow to the back pressure control valve positioned in the bypass outlet. The back pressure control valve element is separately spring controlled so to open slowly against the bypass fluid flow. Through use of fluid constrictions coordinated with the back pressure control valve element's spring controlled mechanism, change in fluid pressure relative to change in fluid flow is carefully constrained.

The result is a relatively simple back pressure mechanism which maintains a relatively uniform back pressure on the bypass valve, dividing the pressure drop from the inlet to the return line uniformly throughout all rates of flow and thereby minimizing wear and cavitation within the bypass valve.

DESCRIPTION OF THE DRAWINGS

The operation of the present invention should become apparent from the following description when considered in conjunction with the accompanying drawings, in which.

DETAILED DESCRIPTION OF THE INVENTION

The present invention provides a valve for various applications, including bypass recirculation control in centrifugal pumping systems.

Figure 1:
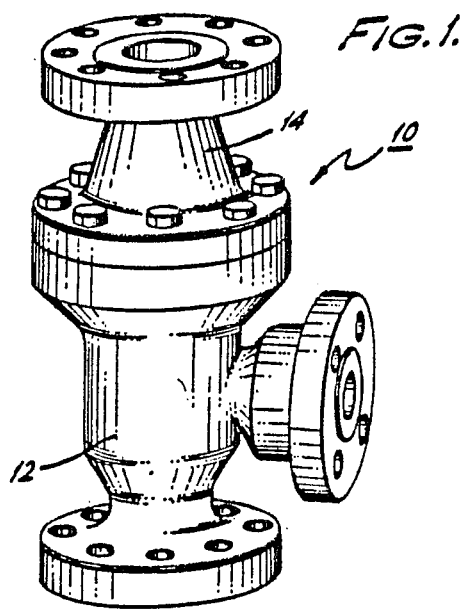
FIG. 1 is a perspective view of the exterior casing containing the present invention.
Figure 2:
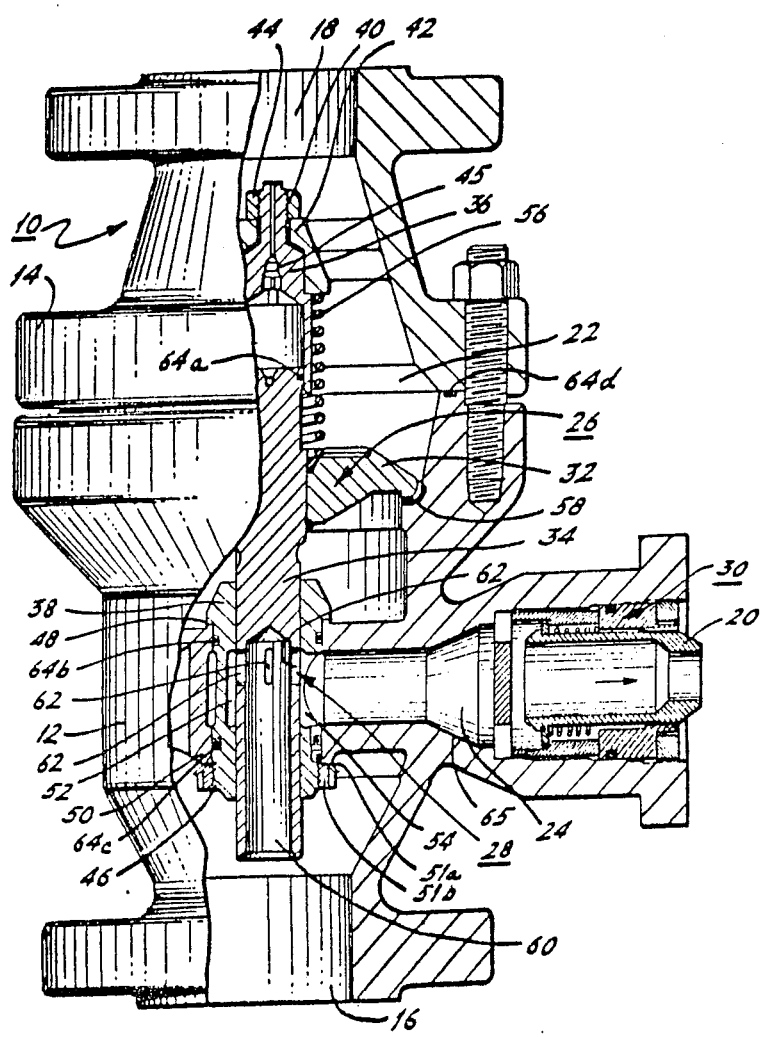
FIG. 2 is a fragmentary view of a main valve element, a bypass valve element, and a back pressure control valve of the present invention.

Illustrated in FIGS. 1 and 2 is a recirculation valve 10, which comprises a main body element 12 and a bonnet element 14. The recirculation valve 10 defines an inlet 16, a main outlet 18, a bypass outlet 20, a main flow cavity 22 extending between the inlet 16 and the main outlet 18, and a bypass cavity 24 extending between the main flow cavity 22 and the bypass outlet 20.

The recirculation valve contains three valve elements: a main valve element 26 positioned within the main flow cavity 22, the position of which is responsive to flow between the inlet 16 and the main outlet 18; a bypass valve elment 28 positioned within the main flow cavity 22 and controlling flow between the inlet 16 and the bypass cavity 24; and a back pressure control valve 30 positioned within the bypass cavity 24 downstream of the supply valve element 28.

The main valve element 26 comprises a valve disc 32 attached substantially perpendicularly to, and intermediate the ends of, a main valve rod 34, said rod 34 positioned coaxially within the main flow cavity 22. The main valve rod 34 is retained in coaxial alignment with the main flow cavity 22 by insertion within an upper guide bushing 36 and through a bypass bushing 38 having an interior which is primarily cylindrical.

The upper guide bushing 36 includes a threaded end 40. The upper guide bushing 36 is positioned within the main flow cavity 22 via insertion of the threaded end 40 through a bushing cap 42 affixed to the bonnet element 14. A lock nut 44 is employed to attach to the threaded end 40 and anchor the upper guide bushing 36 within the bushing cap 42. The interior of the upper guide bushing 36 is adapted to permit vertical movement of the main valve rod 34 within the parameters set for movement of and flow through the disc valve in the main flow cavity 22. To this end a snubber orifice 45 is provided to permit displacement flow of fluid into and out of the interior of the upper guide bushing 36.

The bypass bushing 38 includes a threaded end 46 and an annular flange end 48. The bypass bushing 38 is adapted to fit snugly within a bypass valve juncture 50 affixed to the main body element 12. The bypass bushing 38 is held in place by a lock washer 51a and a lock nut 51b attached to threaded end 46. The bypass bushing 38 contains a medial cavity 52 having a medial port 54 communicating the medial cavity 52 and the bypass cavity 24.

A main spring 56 is provided extending between the valve disc 32 and the bushing cap 42. The main spring 56 is sized so to maintain the valve disc 32 in a closed position against an annular main valve disc seat 58 when there is no demand for fluid flow through the main outlet 18.

The bypass valve element 28 is housed in a cylindrical passage 60 within the lower portion of the main valve rod 34. At the uppermost portion of the passage 60 is a series of four orifices 62. The orifices 62 are positioned so to communicate the passage 60 and the medial cavity 52 when the main valve element 26 is in its lowermost position with the valve disc 32 sealed against the main valve seat 58.

When there is a demand for fluid downstream of the main outlet 18, as for example in a steam generating system supplied by the centrifugal pump, fluid flow through the valve moves the valve disc 32 away from the main valve seat 58. This moves the main valve rod 34 upward, causing the bypass bushing 38 to progressively seal off the orifices 62. As full flow through the main valve element 26 is approached, the orifices are positioned so that no communication occurs between the passage 60 and the medial cavity 52.

O-rings 64a, 64b, 64c, 64d are positioned at critical places throughout the valve 10 to assure proper seals and correct fluid flow.

Figure 4:
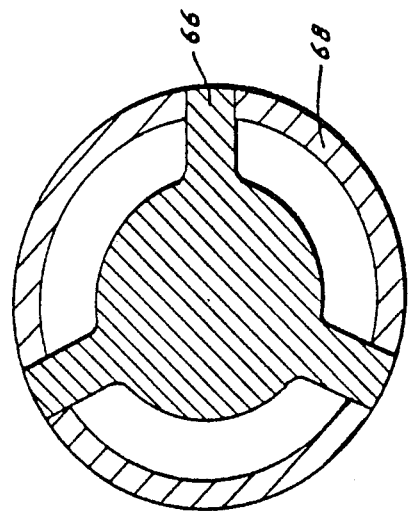
FIG. 4 is a planar view of a valve seat member of the back pressure control valve of the present invention.
Figure 3:
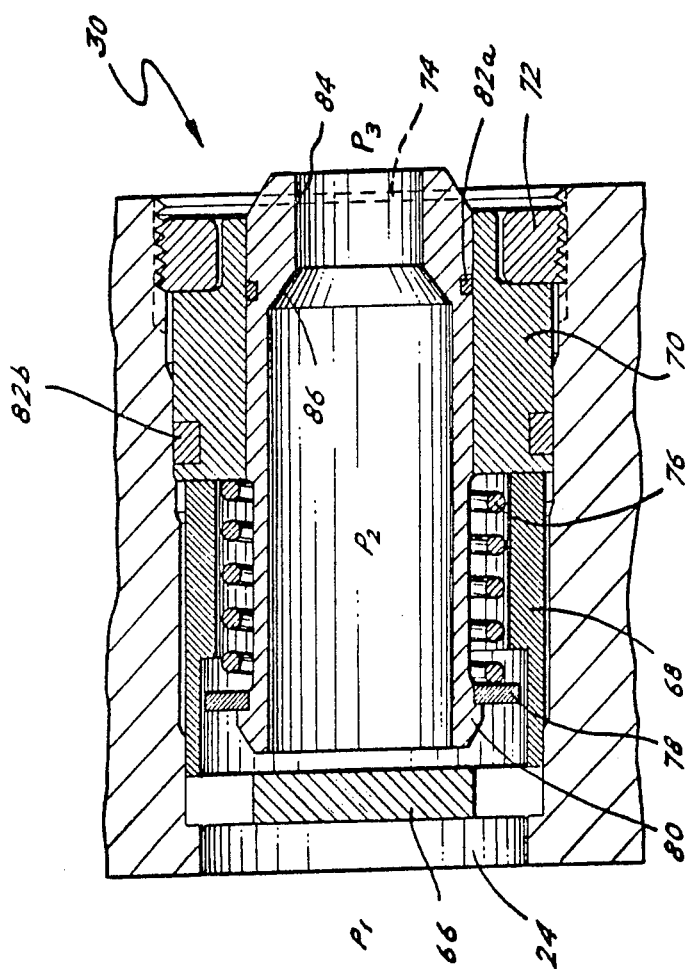
FIG. 3 is an enlarged sectional view of the back pressure control valve of the present invention.

The back pressure valve control 30 shown in FIGS. 2, 3 and 4 contributes extensively to the smooth operation of the present invention and protects the bypass valve from cavitation and erosion. The bypass cavity 24 comprises a number of different sized cylindrical portions arranged in a progressively increasing stepped fashion between a relatively narrow cylindrical portion abutting the medial port 54 and a relatively wide cylindrical portion comprising the bypass outlet 20. The cylindrical portions are connected by way of a sloping frustoconical portion 65.

In the illustrated embodiment of the present invention, the back pressure control valve 30 is positioned within the bypass cavity 24 to further control the recirculating fluid. If desired, however, it may be placed in the return line (not shown) to the low pressure return vessel or to the pump. The back pressure control valve 30 comprises: a back pressure control valve seat 66 attached to a lower sleeve casing 68; an upper sleeve casing 70; an outside threaded nut 72 adapted to be screwed into the main body element 12 and secure the back pressure control valve 30 within the bypass cavity 24; a spring-controlled valve sleeve 74; a back pressure control valve spring 76; and a washer 78 surrounding the valve sleeve 74, abutting a lip 80 on the upstream end of the valve sleeve 74, and retaining the back pressure control valve spring 76 between the lip 80 and the upper sleeve casing 70. Seals 82a, 82b are provided to assure proper fluid flow.

The interior of the valve sleeve comprises two cylindrical portions—a relatively wide portion on the upstream portion of the valve sleeve 74 and a relatively narrow portion serving as a pressure reducing orifice 84. A frustoconical transition 86 is provided intermediate the two cylindrical portions.

When the bypass valve element 28 is closed, providing no bypass flow, the back pressure control valve 30 is likewise in a closed position with the valve sleeve 74 held against the back pressure control valve seat 66 through the action of the back pressure control valve spring 76. As the bypass valve element 28 begins to open, fluid flow through the bypass cavity 24 will exert pressure against the valve sleeve 74 thus compressing the back pressure control valve spring 76. The pressure will displace the valve sleeve 74 from the back pressure control valve seat 66 and permit some fluid to flow through the valve sleeve 74 and out the exit port 84. When the bypass valve element 28 is fully open, the valve sleeve 74 will be extended somewhat outside the bypass outlet 20, as is shown in FIG. 2, thus permitting full bypass fluid flow. The closing of the supply valve element 28 causes the process to be reversed, with a steady closing of the valve sleeve 74 against the back pressure control valve seat 66.

The sizing of the various components of the present invention, including the valve sleeve 74, the back pressure control valve seat 66, the back pressure control valve spring 76, and the restricted orifice 84, can be used to control the change in pressure through the back pressure control valve 30 with change in flow through the valve 30. Theoretically, little or no change in pressure with change in flow through the back pressure valve is desired. However, for stability, a slight increase in pressure with increase in flow is preferred. The present invention readily achieves this ideal.

Figure 5:
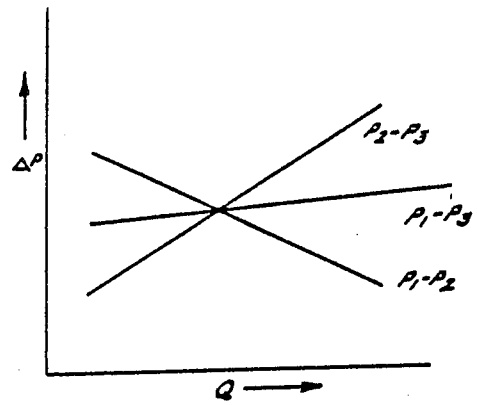
FIG. 5 is a graph depicting change in pressure versus change in flow through the back pressure control valve.

The net effect desired and achieved by the present invention is shown in the graph of FIG. 5 wherein the "y" axis is change in pressure ($\Delta P$) and the "x" axis is the change in flow (Q). The present invention provides a steadily decreasing change in pressure with increasing flow between positions $P_1$ and $P_2$ on FIG. 3 and steadily increasing change in pressure with increasing flow between positions $P_2$ and $P_3$ on FIG. 3. Properly sized components nearly balance out these forces to provide only slightly increasing overall pressure changes between $P_1$ and $P_3$ with increasing flow through the back pressure control valve 30. With this construction, the pressure drop from the main inlet to the low pressure return vessel is divided at a relatively uniform ratio between the bypass valve and the back pressure control valve throughout all rates of flow of the fluid passing through the bypass.

While a particular embodiment of the present invention has been disclosed herein, it is not intended to limit the invention to such a disclosure, and changes and modifications may be incorporated and embodied within the scope of the following claims.

What is claimed is:

1. An automatic recirculation valve, for smoothly switching fluid flow between a main fluid artery and a recirculation fluid artery, having an inlet, a main outlet, and a bypass outlet and a main valve element responsive to flow between said inlet and said main outlet, wherein the improvement comprises:

providing a back pressure control valve controlling fluid flow entering the recirculation fluid artery, and a bypass valve element controlling fluid flow between the inlet and the bypass outlet:

means interconnecting the main valve element and the bypass valve element wherein flow through the bypass valve element is regulated by movement of the main valve element, and pressure controlling means in said back pressure control valve, said pressure controlling means being a valve sleeve having pressure responsive means closing against a valve seat;

whereby said back pressure control valve regulates fluid flow so to stabilize fluid pressure with change in fluid flow therethrough.

2. ApParatus of claim 1 wherein said valve sleeve is provided with an interior surface which constricts fluid flow therethrough.

3. Apparatus of claim 2 wherein said pressure responsive means comprises the valve sleeve surrounded by and attached to a washer, and a spring abutting said washer and actuating said valve sleeve against recirculation fluid flow.

4. Apparatus of claim 1 wherein said bypass valve element is integral with a main valve rod, said rod being attached to and moving with the main valve element.

5. Apparatus of claim 4 wherein said bypass valve element comprises a passage and at least one port within the main valve rod providing fluid communication between the inlet and the back pressure control valve when the main valve is less than fully open.

* * * * *